(12) United States Patent
Turunen

(10) Patent No.: US 7,218,731 B2
(45) Date of Patent: May 15, 2007

(54) LOCKING ARRANGEMENT FOR A COVER PART OF A SUBSCRIBER TERMINAL DEVICE

(75) Inventor: Harri Turunen, Kuopio (FI)

(73) Assignee: Flextronics Sales & Marketing(A-P)Ltd., Port Louis (MU)

( * ) Notice: Subject to any disclaimer, the term of this patent is extended or adjusted under 35 U.S.C. 154(b) by 269 days.

(21) Appl. No.: 10/187,450

(22) Filed: Jul. 2, 2002

(65) Prior Publication Data

US 2003/0012370 A1 Jan. 16, 2003

(30) Foreign Application Priority Data

Jul. 2, 2001 (FI) ................... 20011443

(51) Int. Cl.
*H04M 1/02* (2006.01)
*H04B 1/38* (2006.01)
(52) U.S. Cl. ................ 379/433.12; 429/97; 455/575.1; 455/575.4; 455/90.3
(58) Field of Classification Search .......... 379/433.01, 379/433.08, 433.11, 433.12; 455/90.3, 575.1, 455/575.4; 429/97
See application file for complete search history.

(56) References Cited

U.S. PATENT DOCUMENTS 5,308,716 A * 5/1994 Shababy et al. ............. 429/97
6,060,193 A * 5/2000 Remes et al. ................. 429/96
6,081,595 A 6/2000 Picaud
6,151,485 A 11/2000 Crisp
2002/0160255 A1* 10/2002 Babcock et al. ............. 429/97

FOREIGN PATENT DOCUMENTS

EP 0 892 447 A1 1/1999
JP 2000-235847 8/2000

* cited by examiner

*Primary Examiner*—Harry S. Hong
(74) *Attorney, Agent, or Firm*—Squire, Sanders & Dempsey L.L.P.

(57) ABSTRACT

The present invention relates to a locking arrangement for a cover structure of a portable terminal device of a telecommunication system. The cover structure comprises at least one frame part (14), a cover part (16) connected to the frame part that can be removed from the frame part by the user, and locking elements for attaching the cover part to the frame part. In order that one could achieve a secure attachment and locking for the accumulator cover or accumulator packet of the device that at the same time enables the eliminating of the excessive clearances between the can parts, the locking elements comprise, in the frame part and cover part, slide bars (50, 51) and slide grooves (80) corresponding to each other.

8 Claims, 3 Drawing Sheets

LOCKING ARRANGEMENT FOR A COVER PART OF A SUBSCRIBER TERMINAL DEVICE

TECHNICAL FIELD OF THE INVENTION

The invention relates to attachment and locking of a removable cover part of a terminal device, particularly a portable subscriber terminal device of a telecommunication system, such as an accumulator cover or accumulator packet, to the rest of the device structure of the subscriber terminal device.

BACKGROUND OF THE INVENTION

The body of a subscriber terminal device such as e.g. a mobile station typically comprises two cover parts, a so-called A cover and a B cover, of which the A cover forms the front part of the device body and the B cover the rear part of the body. In addition, the device comprises some kind of cover or corresponding for closing the battery space in other words the accumulator space of the device. The accumulator may also be integrated into the cover, in which case one speaks about a so-called accumulator packet. In that case, there is no separate cover in the device; instead the accumulator packet forms a part of the outer cover of the device. An accumulator packet is herein used to mean such an arrangement in which the accumulator is integrated into the cover structure.

The accumulator cover may also be responsible for pressing the accumulator against the device structure to prevent the accumulator from moving. It is, however, possible that excessive clearance is created between the cover and the rest of the device structure, in which case the cover is not pressing the accumulator with a sufficient force. At least part of the clearance may be created in the manufacture phase, and it may naturally increase as a result of abrasion caused by use. If the accumulator cover, due to a clearance, manages to move too much, also the accumulator may move, which may cause problems in the current supply of the device. If the locking of the accumulator cover fails to hold, the cover may even open by itself, in which case the accumulator may fall off its space.

The goal of the invention is to overcome the above-mentioned disadvantages and to achieve a solution by means of which one can get the attachment and locking of an accumulator cover, accumulator packet or other cover part, removable and attachable by the user, to the device structure more dependable than before, and thus also the operating reliability of the device better than before.

SUMMARY OF THE PRESENT INVENTION

The objective of the invention is to improve the attachment and locking of an accumulator cover or accumulator packet of a portable terminal device such as a mobile station to the rest of the device structure. More particularly, the objective of the invention is to achieve for the accumulator cover or accumulator packet such an attachment solution that enables a secure attachment and locking to the rest of the device structure so that the excessive clearances between the cover parts of the device can be easily eliminated. The present invention provides a locking arrangement for a cover structure of a portable terminal device of a telecommunication system.

According to a first aspect of the present invention there is provided a locking arrangement for a cover structure of a portable terminal device of a telecommunication system, said cover structure comprising at least one frame part, a cover part connected to the frame part that can be removed from the frame part by the user, and locking elements for attaching the cover part to the frame part, in which the locking elements comprise, in the frame part and cover part, slide bars and slide grooves corresponding to each other, and that the slide grooves are provided with horns of a groove extending over the grooves in their transverse direction, and the slide bars with locking grooves, corresponding to them, extending over them in the transverse direction of the bars, into which the horns of a groove settle when the cover is in place in the frame part.

Preferably, the locking elements comprise, in addition, spring-like locking elements that are adapted to press the cover part being put in place away from the frame part so that the slide bars and grooves are pressed against one another in the aforementioned transverse direction.

Preferably, the cover part comprises side walls on whose inner surfaces the slide bars have been fitted, and that the slide grooves have been fitted into the outer surface being against the aforementioned inner surfaces of the frame part.

Preferably, in the slide bars there is a wedge-like tip part in which one has formed aforementioned locking grooves. Preferably, the slide bars comprise substantially parallel thin walls, which are in the transverse direction separated from each other, so that empty space is left between them, and which have been integrated into a solid wall structure at the ends.

Preferably, the spring-like locking elements comprise arched locking protruding parts made of metal that yield when the cover is in place in the frame part. More preferably, the locking arrangement comprises, in addition, at least two locking gutters, into which the locking protruding parts have been fitted to settle, when the locking horns of a groove settle in the locking grooves.

Preferably, the cover part is the cover of the accumulator space of the terminal device. Preferably, the cover part comprises the accumulators of the terminal device.

The idea of the invention is to connect the accumulator cover or accumulator packet to the cover part by providing the accumulator cover/accumulator packet with longitudinal slide grooves or slide bars corresponding to one another and placing themselves one within the other that are provided with transverse locking horns of a groove and correspondingly with locking grooves, in which case the locking grooves disposed in the bars lock the accumulator cover or packet length-wise in place by being locked near the locking horns of a groove.

The solution of the invention has several advantages. The locking is in the first place, as concerns its structure, such that it will hold very well. Since the slide bars and grooves place themselves one within the other, the accumulator cover or accumulator packet may also be locked in the transverse direction by using spring-like locking elements which press the accumulator cover or packet away from the rest of the device structure, in which case the locking bars and grooves are pressed against each other while at the same time removing the possible clearances.

The structure of the locking device is also simple, which makes the locking of the cover easy to accomplish. This means basically that the locking of the cover requires of the user only a little force, but regardless of this the locking of the cover does not easily open by itself. Instead, the user may himself/herself open the locking when he or she so wishes.

Since the locking structure is part of the cover structure, it does not require separate movable or removable parts. In this way, the locking of the cover is cost-effective to implement.

BRIEF DESCRIPTION OF THE DRAWINGS

For a better understanding of the present invention and in order to show how the same may be carried into effect reference will now be made to the accompanying drawings, in which.

DETAILED DESCRIPTION OF CERTAIN EMBODIMENTS

Figure 1:
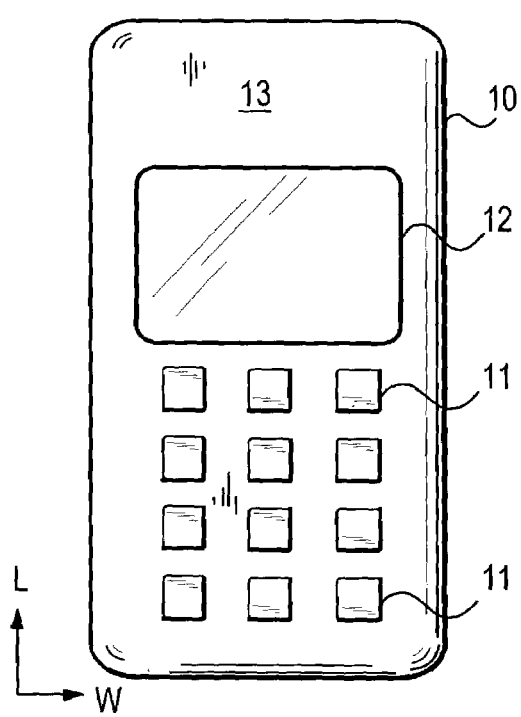
FIG. 1 shows a subscriber terminal device as seen from the front.

FIG. 1 shows a typical subscriber terminal device as seen from the front. The subscriber terminal device shown in the figure is a mobile station 10, which comprises among other things keys 11 and a display 12. Of the cover or enclosure structure of the terminal device, one can see in the figure the front cover, i.e. a so-called A cover 13. The cover structure may be e.g. plastic, fiberglass or metal.

Figure 2:
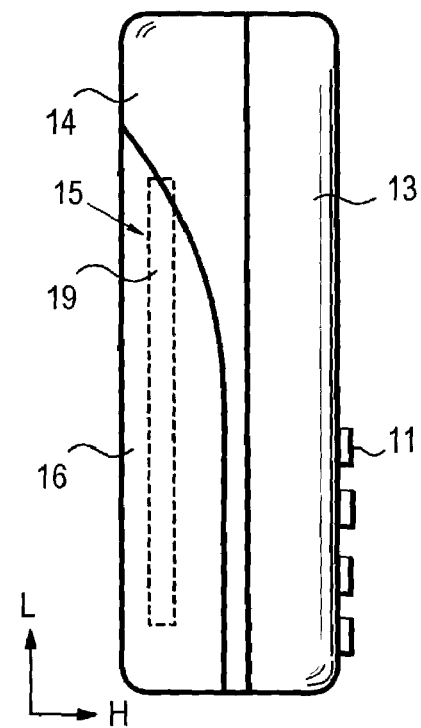
FIG. 2 shows a subscriber terminal device as seen from the side.

FIG. 2 shows the subscriber terminal device as seen from the side, in which case the cover structure can be better seen. In addition to the front cover, the subscriber terminal device comprises a rear part, i.e. a so-called B cover 14, in which one has formed an accumulator space 15 for the accumulator 19. The presented subscriber terminal device comprises, in addition, an accumulator cover 16 for closing the accumulator space 15. The accumulator space is thus formed in between the B cover and the accumulator cover. Since hereinafter, a reference is made to the different directions of the cover structure, in FIGS. 1 and 2, the longitudinal direction of the structure is denoted by reference mark L, the lateral direction by reference mark W, and the elevation by reference mark H.

Figure 3:
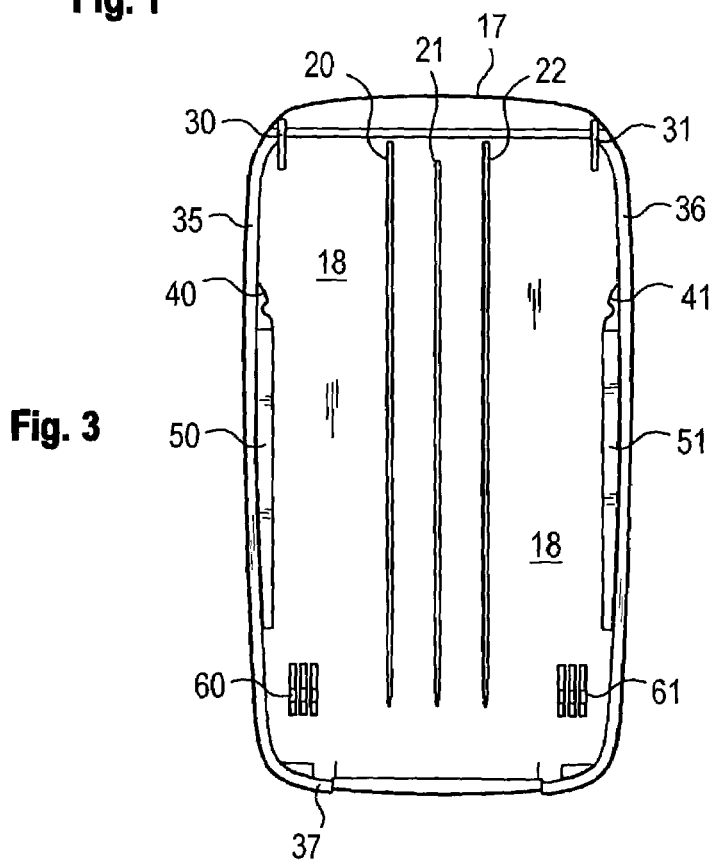
FIG. 3 shows an accumulator cover as seen from the inner surface.

FIG. 3 shows the accumulator cover 16 as seen from the inner surface. The accumulator cover comprises on the inner surface three bars 20, 21 and 22 adjacent between themselves that are substantially parallel and extend length-wise almost across the whole cover. The middle bar 21 is disposed substantially in the center of the accumulator space. The bars reduce the possible clearance between the accumulator and the accumulator cover in the accumulator space, so their height corresponds at the maximum to the height of the accumulator space less the height of the accumulator.

Figure 4:
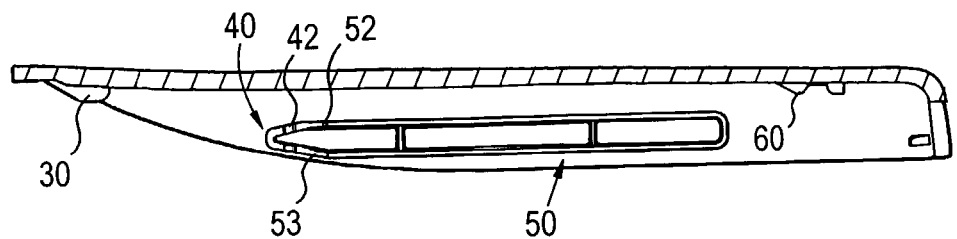
FIG. 4 is a cross-sectional longitudinal view of the accumulator cover.
Figure 5:
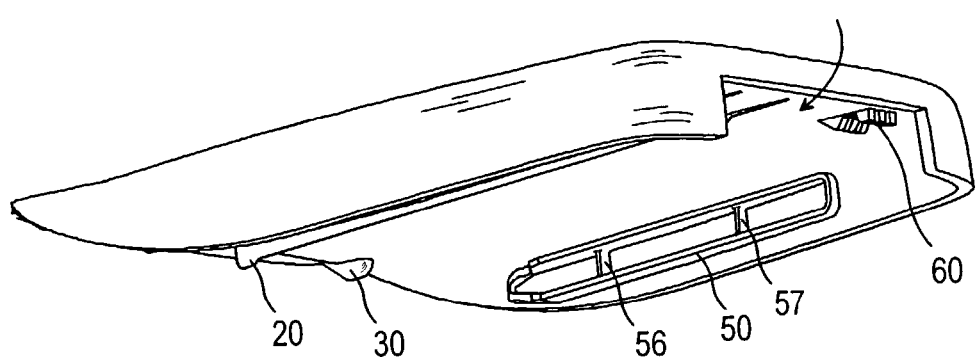
FIG. 5 is a perspective view of the accumulator cover.

The accumulator cover 16 comprises, in addition, two protruding parts 30 and 31, which are disposed at the upper end 17 of the accumulator cover. The protruding parts are on the inner surface length-wise substantially in the same plane, and furthermore in the lateral direction of the accumulator cover, on the opposite sides of the inner surface of the accumulator cover. The free end of each protruding part is directed substantially perpendicularly away from the inner surface of the cover. As can be seen from FIGS. 4 and 5 shown below, the end at the upper end of the accumulator cover of the protruding parts bevels towards the upper end of the cover. In FIG. 2 it can be seen that the accumulator cover extends from its upper part a little over the upper edge of the accumulator space.

As seen from the direction of FIG. 3, the accumulator cover 16 is principally a structure part of a subscriber terminal device that comprises three walls and a bottom 18. The walls are substantially perpendicular with respect to the bottom. The aforementioned walls are sidewalls 35 and 36 on the long flanks of the accumulator cover, and a wall 37 at the lower end of the cover that is an opposite end with respect to the upper end 17 of the cover. The accumulator cover lacks a wall solely on the edge at the upper end.

The accumulator cover 16 comprises on each sidewall (35 and 36) of the cover a slide bar 50 and 51, respectively. In the wedge-like tip parts 40 and 41 at the upper end of the cover of each slide bar there are the locking parts of the accumulator cover that are locked into the locking horns of a groove of the slide bars disposed in the B cover, as will be described below.

In addition, the accumulator cover preferably comprises two locking gutters 60 and 61, which are used as the corresponding pieces of the so-called locking protruding parts (shown in FIG. 6) for locking the accumulator cover and removing the clearance in the elevation plane of the cover. The locking gutters consist of pieces extending inwards from the bottom 18 of the accumulator cover that are in respect of their shape such that near them, two successive horns of a groove are formed in the longitudinal direction of the cover between which there is a lower gutter part.

FIG. 4 is a cross-sectional longitudinal view of the accumulator cover. From this angle of view, the lateral profile of the accumulator cover can be seen very well. From the figure one can also see that the sidewalls of the accumulator cover bevel towards the upper end of the cover. The slide bars are advantageously of the "lightened type" as presented in the figure, i.e. they are not closed type bars, but consist of walls (extending inwards from the inner surfaces of the side walls of the cover) between which empty space is left. The tip parts of the slide bars are tapering towards their free end, which has been implemented so that on the side of the upper end of the cover, the upper edge 52 and lower edge 53 of the slide bar 50 are obliquely connected, in which case they form in the slide bar a substantially wedge-like tip part 40 or 41. In this tip part there is a locking groove or notch 42 extending across the bar that operates jointly with the locking horns of the slide groove (will be presented later) of the B cover for locking the accumulator cover. Both slide bars comprise a locking groove 42. As can be seen from FIG. 3, the tip part can be wedge-like also in such a manner that the width of the bar gets smaller towards the free end.

FIG. 5 represents the accumulator cover as seen obliquely from the back, in which case the structure and shape of the slide bar can be easily seen. As was mentioned above, the upper and lower edges of the slide bar are raised on the inner side in the sidewall. The area between the edges in question is of the same plane with the sidewall surface, except for the transverse reinforcements 56 and 57 locally combining the upper and lower edges. The accumulator cover also comprises a slot 19 of substantially rectangular shape and disposed in the wall of the lower end, into which a connector for the charger cable is inserted.

Figure 6:
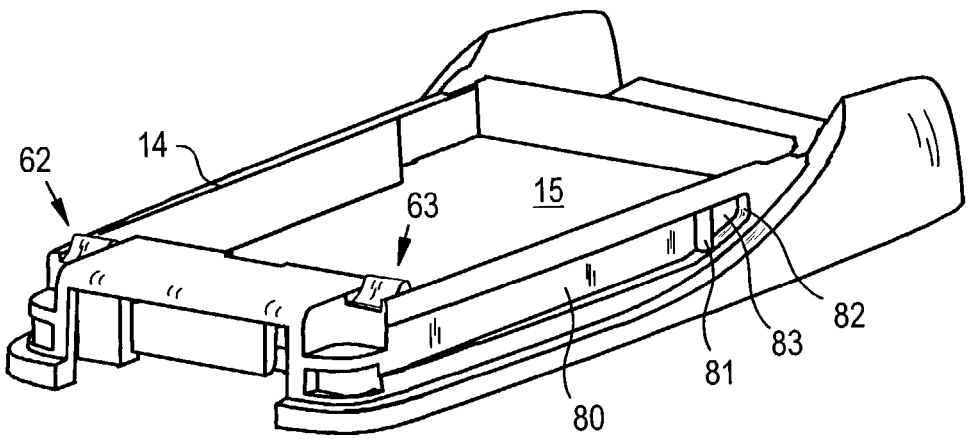
FIG. 6 is a perspective view of a B cover of a terminal device.

FIG. 6 represents the B cover 14 of a subscriber terminal device as seen obliquely from the back. The B cover comprises, on its both longitudinal outer edges, a slide groove 80 for the slide bars 50 and 51 of the accumulator cover. The slide groove is thus on that side wall of the B cover the wall surface on the opposite side of which is the side wall of the accumulator space 15. From the figure, also the accumulator space 15 can now easily be seen that is closed by an accumulator cover.

In opening or closing the accumulator space, the accumulator cover is pushed so that the slide bars inside it slide along the slide groove. The depth of the slide groove 80 (the measure of the groove in the lateral direction of the structure) substantially corresponds to the elevation (the measure of the bar in the lateral direction of the structure) of the slide bar, and its width (the measure of the groove in the elevation plane of the structure) is a little bigger than the width of the slide bar (the measure of the bar in the elevation plane of the structure), so the slide bar fits very well into the slide groove. The width of the slide groove 80 may not, however, deviate very much from the width of the groove in order that there is not too much clearance left between the cover and the accumulator cover, in which case the accumulator cover might, when in the groove, move by itself when influenced by even very small forces subjected to the accumulator cover.

From FIG. 6 it can also be seen that the B cover comprises locking horns of a groove 81 in the slide groove 80 that extend across the groove in the lateral direction (in the elevation plane of the structure) of the groove. The height of the locking horns of a groove substantially corresponds to the depth of the groove, i.e. the upper edge of the horns of a groove reaches substantially the same plane as the edges of the groove.

In the presented implementation mode, the length of the slide groove 80 is a little bigger than the length of the slide bar. From FIG. 6 it can be seen that the slide groove begins from the lower end of the B cover, extending length-wise along the flank of the B cover. The slide groove is open at the lower end of the B cover. At the other end, the slide groove is closed, i.e. it comprises an end edge 82. As can be seen from the figure, the locking horns of a groove 81 are located at that end of the groove 80 in which the end edge 82 is. Between the locking horns of a groove 81 and the end edge 82 there is a slide groove extension 83, which tapers towards the end 82, in which case the width of the groove at the end is smaller than its width near the horns of a groove.

In the B cover 14 there are advantageously also the arched locking protruding parts 62 and 63 shown in FIG. 6 that consist of spring-like protruding parts made e.g. of a thin metal sheet that operate jointly with the locking gutters 60 and 61 disposed on the inner surface of the accumulator cover. In pushing the accumulator cover in place, the locking protruding parts yield and settle in the locking gutters. In this state, they subject the accumulator cover to a spring force, trying to lift the accumulator cover away from the B cover, in which case the slide bars are pressed against the edge of the slide groove. This enables one to avoid the problems caused by the clearance possibly existing between the accumulator cover and the B cover.

Figure 7:
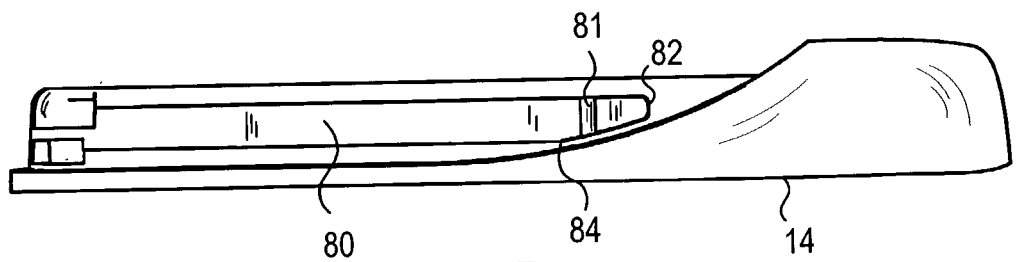
FIG. 7 shows the B cover as seen from the side.

FIG. 7 represents the B cover of a subscriber terminal device as seen directly from the side. The slide groove 80 extends along the flank of the B cover a little over the center of the B cover. As was stated above, the slide groove extension 83 bevels towards the end 82. More particularly, there is an angle 84 in the slide groove 80 at that end where the slide groove extension 83 is. The angle is in the lower edge of the groove, and starting from the aforementioned angle, the lower edge of the slide groove approaches the upper edge of the slide groove, which is straight throughout the whole length of the groove. The locking horns of a groove are located between the angle 84 disposed in the slide groove and the end 82, being a little closer to the angle 84 than to the end 82.

Figure 8:
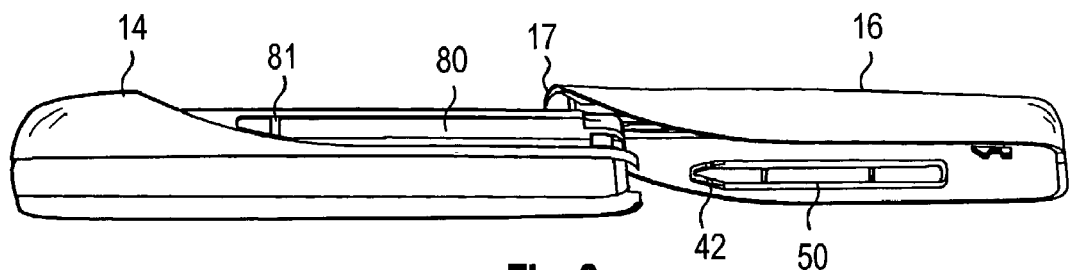
FIG. 8 and FIG. 9 illustrate the putting of the accumulator cover in place.
Figure 9:
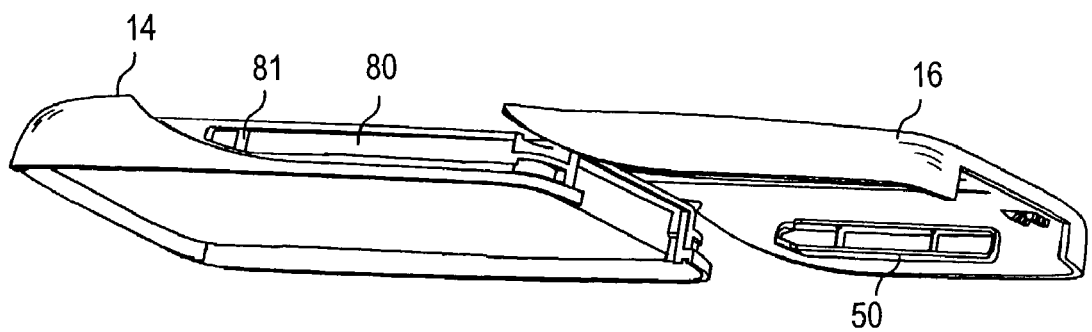

FIGS. 8 and 9 represent the B cover 14 of a subscriber terminal device, and an accumulator cover 16 to be placed into it. Prior to placing, the accumulator cover has to be in such a position with respect to the B cover that the slide bars can be pushed into the slide grooves of the B cover. When the accumulator cover has been pushed far enough along the slide grooves, the locking groove disposed in each slide bar touches the horns of a groove disposed in the slide groove. When one further continues pushing the accumulator cover, the wedge-like tip of the locking means penetrates into the slide groove extension, locking the accumulator cover in place.

Figure 10:
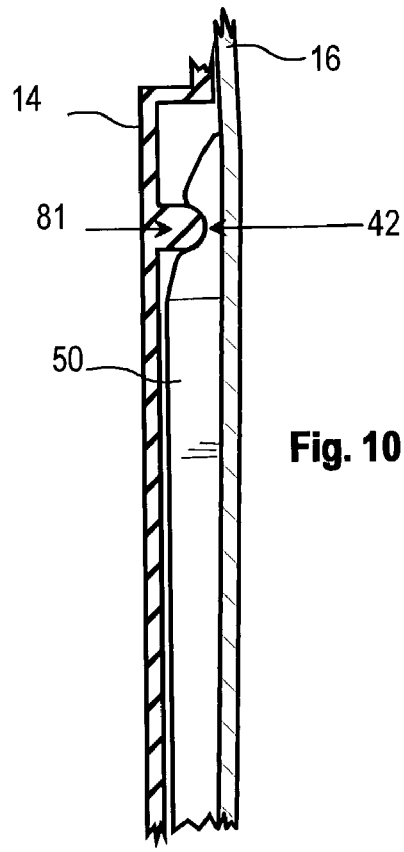
FIG. 10 shows the locking mechanism of the accumulator cover in more detail.

FIG. 10 is a cross-sectional view illustrating, in more detail, the locking mechanism of the accumulator cover as seen from above. FIG. 10 thus illustrates a situation in which the accumulator cover 16 is already locked. The figure shows the locking groove or notch 42 disposed at the wedge-like end of the slide bar that has been fitted for the locking horns of a groove 81 of the B cover 14 and extends across the bar. When the accumulator cover is slid along the slide groove, the horns of a groove 81 disposed in the B cover settle in the slot 42 at the end of the locking bar, locking the accumulator cover. The shape of the slide groove extensions may correspond to the shape of the wedge-like tip part.

The horns of a groove 81 do not necessarily have to be in the B cover or in the cover of the locking grooves. In other words, instead of the accumulator cover, the slide bars may be disposed in the B cover, and the slide groove in the accumulator cover instead of the B cover, in which case the locking horns of a groove are in the accumulator cover and the slots in the B cover.

When the accumulator cover is pushed in place, the wedge-like tip part forces the accumulator cover to yield to the side, in which case the locking groove snaps into the horns of a groove disposed in the slide groove, locking the accumulator cover length-wise in place. At the same time, the locking protruding parts 62 and 63 snap into the locking gutters corresponding to them, locking the accumulator cover in place in its elevation plane. The presented locking arrangement can be applied to the locking of an accumulator cover or accumulator packet. In the case of an accumulator packet, there is a cover structure already connected to the accumulator that functions as some cover part of the subscriber terminal device, in which case no separate cover for the accumulator space is needed. Typically, the accumulator packet functions as the rear cover of the subscriber terminal device or a part of it.

The accumulator cover is opened so that the accumulator cover is pressed in the middle, causing the sidewalls of the accumulator cover and thus also the slide bars to slide substantially perpendicularly away from the B cover as the material yields. When pressing the accumulator cover the locking notch in each slide groove is released from the corresponding horns of a groove. When the accumulator cover is pressed and simultaneously pulled away from the B cover, the accumulator cover can be removed and wholly released from the B cover. The wedge-like tip parts 40 and 41 of the slide bars substantially facilitate the removing of the accumulator cover.

Although the invention has been described above with reference to the examples according to the accompanying drawings, it is understood that the invention is not limited to it, but can be modified without departing from the inventive idea as set forth by the accompanying claims. For example, the locking gutters and locking protruding parts corresponding to them are not necessary. In that case, though, part of the advantages of the invention is lost.

The invention claimed is:

1. A locking arrangement for a cover structure of a portable terminal device of a telecommunication system, said cover structure comprising at least one frame part (14), a cover part (16) connected to the frame part that can be removed from the frame part by the user, and locking elements for attaching the cover part to the frame part, wherein the locking elements comprise, in the frame part and cover part, slide bars (50, 51) and slide grooves (80) corresponding to each other, and that the slide grooves are provided with horns of a groove extending over the grooves in a transverse direction of the grooves, and the slide bars are provided with locking grooves, corresponding to the horns of a groove, the locking grooves extending over the slide bars in the transverse direction of the bars, into which the horns of a groove settle when the cover is in place in the frame part, wherein the slide bars include a wedge tip part in which the locking grooves have been formed.

2. A locking arrangement according claim 1, wherein the locking elements comprise, in addition, spring locking elements that are adapted to press the cover part being put in place away from the frame part so that the slide bars and grooves are pressed against one another in the aforementioned transverse direction.

3. A locking arrangement according to claim 1 or 2, wherein the cover part comprises side walls on whose inner surfaces the slide bars have been fitted, and that the slide grooves have been fitted into the outer surface being against the aforementioned inner surfaces of the frame part.

4. A locking arrangement according to claim 1, wherein the slide bars comprise substantially parallel thin walls (52, 53), said parallel thin walls being in the transverse direction separated from each other, so that empty space is left between the parallel thin walls, and the parallel thin walls are integrated into a solid wall structure at the ends.

5. A locking arrangement according to claim 2, wherein the spring locking elements comprise arched locking protruding parts (62, 63) made of metal that yield when the cover is in place in the frame part.

6. A locking arrangement according to claim 5, wherein it comprises, in addition, at least two locking gutters, into which the locking protruding parts have been fitted to settle, when the locking horns of a groove settle in the locking grooves.

7. A locking arrangement according to claim 1, wherein the cover part is the cover of the accumulator space of the terminal device.

8. A locking arrangement according to claim 1, wherein the cover part comprises the accumulators of the terminal device.

* * * * *